US012007709B2

(12) United States Patent
Uekawa et al.

(10) Patent No.: US 12,007,709 B2
(45) Date of Patent: Jun. 11, 2024

(54) IMAGE HEATING APPARATUS AND IMAGE FORMING APPARATUS

(71) Applicant: Canon Kabushiki Kaisha, Tokyo (JP)

(72) Inventors: Eiji Uekawa, Shizuoka (JP); Atsushi Iwasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/297,686

(22) Filed: Apr. 10, 2023

(65) Prior Publication Data

US 2023/0324840 A1 Oct. 12, 2023

(30) Foreign Application Priority Data

Apr. 12, 2022 (JP) ................................ 2022-065608

(51) Int. Cl.
*G03G 15/20* (2006.01)

(52) U.S. Cl.
CPC ................................ *G03G 15/2057* (2013.01)

(58) Field of Classification Search
CPC .................................................. G03G 15/2057
See application file for complete search history.

(56) References Cited

U.S. PATENT DOCUMENTS 5,600,420 A * 2/1997 Saito .................. G03G 15/0131 399/302
11,402,776 B2 8/2022 Iwasaki
2015/0139708 A1* 5/2015 Shimura ............ G03G 15/2042 399/329

FOREIGN PATENT DOCUMENTS

JP 10301419 A 11/1998
JP 2016012077 A 1/2016
JP 2021149034 A 9/2021

* cited by examiner

*Primary Examiner* — Stephanie E Bloss
*Assistant Examiner* — Michael A Harrison
(74) *Attorney, Agent, or Firm* — Venable LLP

(57) ABSTRACT

An image heating apparatus includes: a tubular film; a heater disposed in an inner space of the film; a roller that is in contact with the outer surface of the film and forms a nip between the roller and the film together with the heater; and a holder including an adhesion portion to which the heater adheres through an adhesive and supporting the heater. The image heating apparatus heats, using heat of the heater, an image formed on a recording material held and conveyed by the nip in case where the roller rotates. The adhesion portion includes a surface having an uneven shape of projections and recesses repeating in each of a conveyance direction of the recording material and in a longitudinal direction of the heater perpendicular to the conveyance direction, and a depth of the projections and recesses is 50 μm to 300 μm.

10 Claims, 11 Drawing Sheets

FIG. 5A CROSS SECTIONAL VIEW IN RECORDING MATERIAL CONVEYANCE DIRECTION
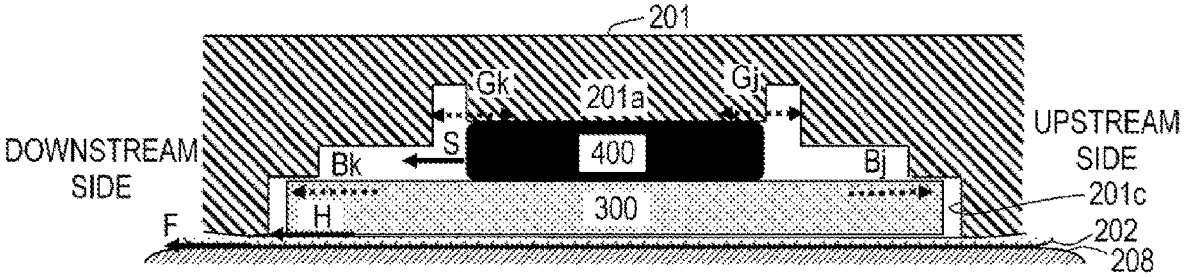
FIG. 5B DIAGRAM IN HEATER LONGITUDINAL DIRECTION
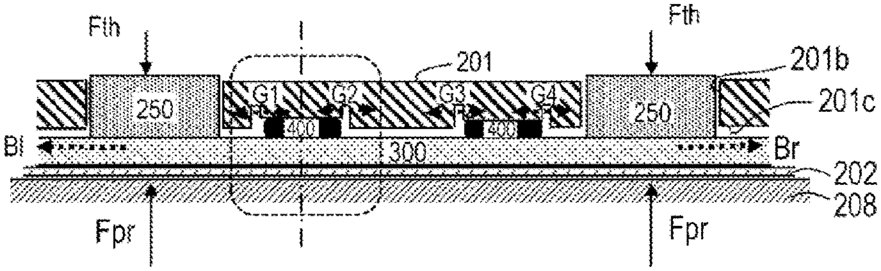
FIG. 5C ENLARGED VIEW OF DOTTED LINE SECTION (PARTIAL PEELING)
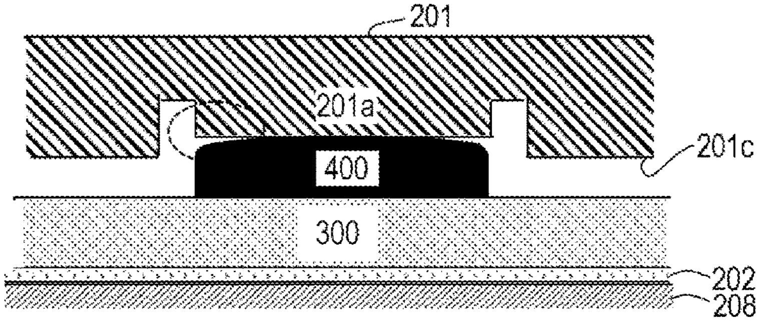

FIG. 6A SEPARATED STATE
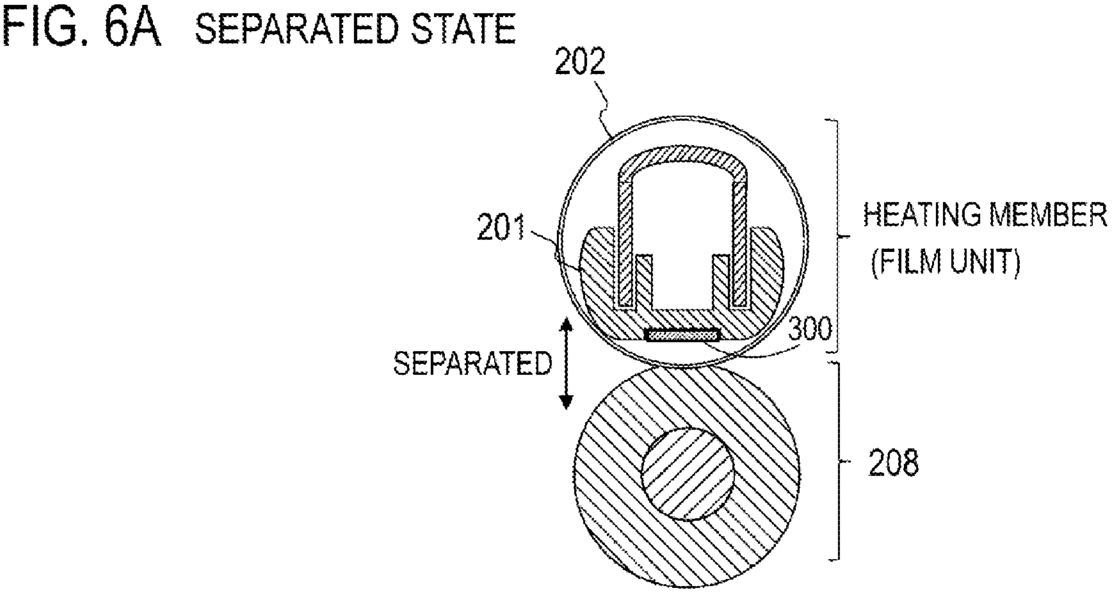
FIG. 6B DIAGRAM OF SEPARATED STATE IN HEATER LONGITUDINAL DIRECTION
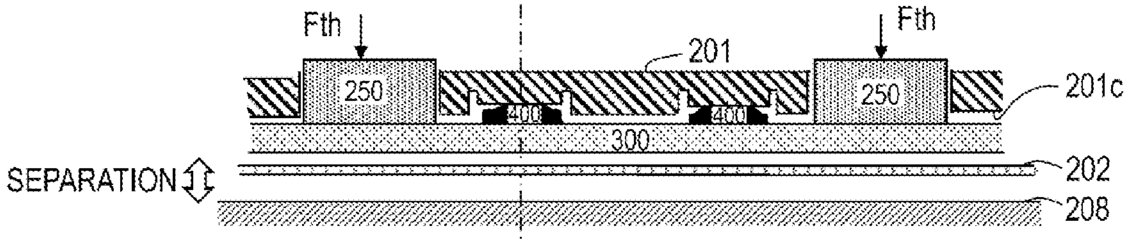
FIG. 6C
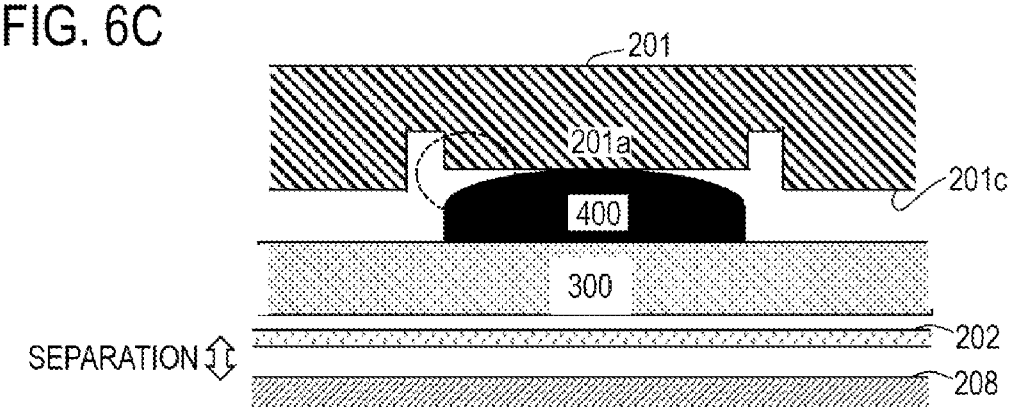

IMAGE HEATING APPARATUS AND IMAGE FORMING APPARATUS

BACKGROUND OF THE INVENTION

Field of the Invention

The present invention relates to an image heating apparatus such as a heat fixing apparatus installed in an image forming apparatus of an electrophotographic recording system, such as a copier and a printer, and a glossing apparatus for increasing the gloss value of an image by reheating the toner image fixed on a recording material.

Description of the Related Art

Conventional image heating apparatuses installed in image forming apparatuses, such as copiers and printers, include a film-heating image heating apparatus that has a tubular fixing film, a heater in contact with the inner surface of the fixing film, and a pressure roller forming a nip portion together with the heater through the film. In this image heating apparatus, the heater is attached to a heater holder. A connector for supplying power to the heater, a thermistor for controlling the temperature of the heater, and a thermo-switch or a thermal fuse as a safety device may be provided on the surface to which the heater is attached. These devices apply a force in a direction that separates the heater from the heater holder. To limit the separation of the heater from the heater holder, Japanese Patent Application Publication No. 2016-012077 describes a configuration in which an adhesive is applied to the heater holder at predetermined intervals in the longitudinal direction so that the heater adheres to the heater holder.

SUMMARY OF THE INVENTION

However, as the heater undergoes thermal expansion caused by energization and heating and thermal contraction after stopping heating, a shearing force is produced in the adhesive between the heater and the heater holder. Also, in an image forming apparatus with a long service life, the adhesion force of the adhesive deteriorates with duration. As a result, the heater may be peeled off from the heater holder. The configuration of Japanese Patent Application Publication No. 2016-012077 has grooves in the adhesion portions of the heater holder to increase the adhesion area and thus enhance the adhesion force. However, further enhancement of the adhesion force is needed to meet the demands for higher print speed and longer life for current image forming apparatuses. That is, when the use temperature of the heater is set higher or the pressurizing force applied to the nip portion is set higher to increase the print speed, an increase in the shearing force described above and deterioration of the adhesion force increase the risk of heater peeling. In an apparatus in which the heating member, including the fixing film and the heater, and the pressure roller are spaced apart from each other when the power is off or the recording material is jammed, peeling of the heater may cause the position of the heater to be deviated from the predetermined position of the heater holder, for example.

It is an object of the present invention to provide a technique capable of increasing the adhesion force between a heater and a heater holder and preventing the heater from being peeled off.

To achieve the above object, an image heating apparatus of the present invention includes:

- a tubular film;
- a heater disposed in an inner space of the film;
- a roller that is in contact with an outer surface of the film and forms a nip between the roller and the film together with the heater; and
- a holder including an adhesion portion to which the heater adheres through an adhesive, the holder supporting the heater,
- wherein the image heating apparatus is configured to heat, using heat of the heater, an image formed on a recording material held and conveyed by the nip in a case where the roller rotates,
- wherein the adhesion portion includes a surface having an uneven shape of projections and recesses repeating in each of a conveyance direction of the recording material and a longitudinal direction of the heater perpendicular to the conveyance direction, and
- wherein a depth of the projections and recesses is 50 μm to 300 μm.

To achieve the above object, an image forming apparatus of the present invention includes:

- an image forming portion configured to form an image on a recording material; and
- a fixing portion configured to fix the image formed on the recording material to the recording material,
- wherein the fixing portion is the image heating apparatus of the present invention.

According to the present invention, it is possible to increase the adhesion force between a heater and a heater holder and prevent the heater from being peeled off.

Further features of the present invention will become apparent from the following description of exemplary embodiments with reference to the attached drawings.

BRIEF DESCRIPTION OF THE DRAWINGS

FIGS. 5A to 5C are explanatory diagrams of the first embodiment of the present invention;

FIGS. 6A to 6C are explanatory diagrams of the first embodiment of the present invention;

DESCRIPTION OF THE EMBODIMENTS

Figure 1:
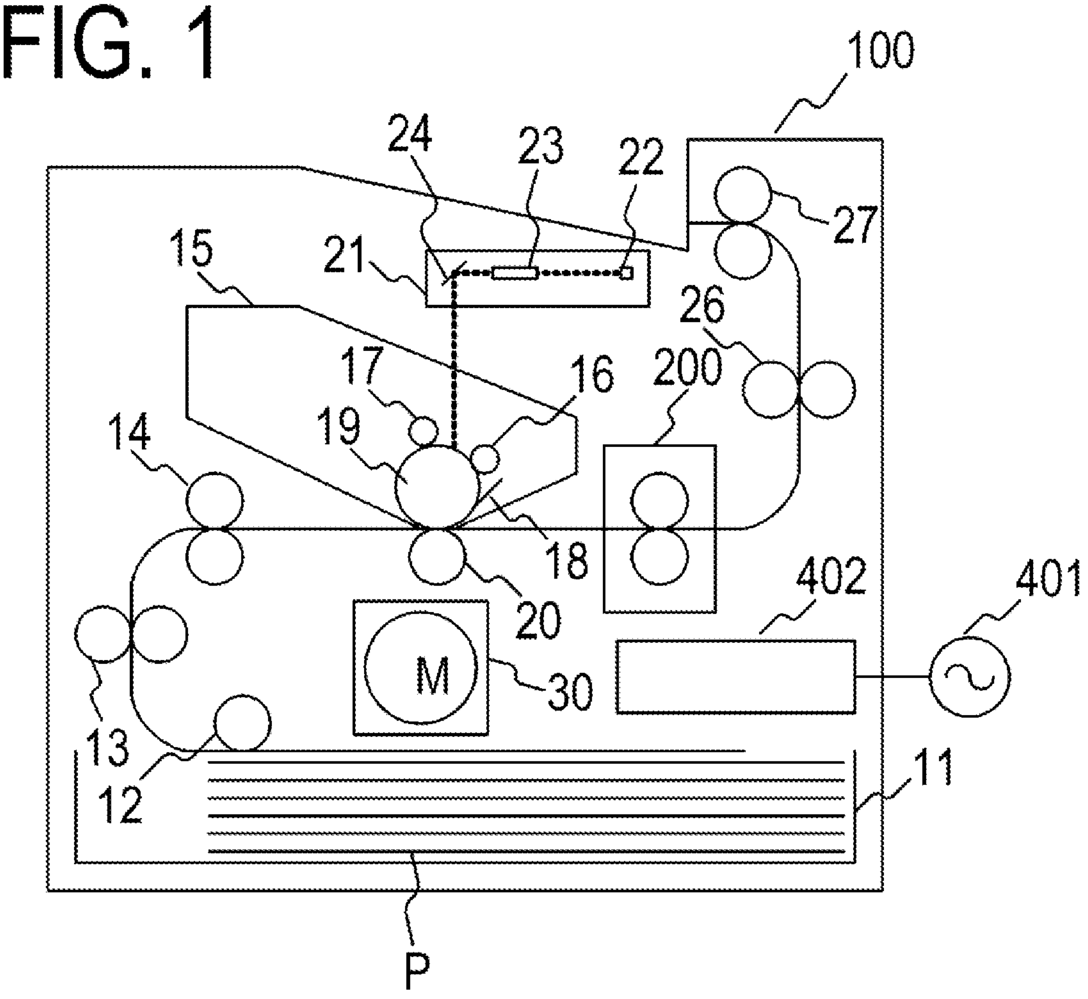
FIG. 1 is a cross-sectional view of an image forming apparatus according to a first embodiment of the present invention.

Referring to the drawings, forms for carrying out the present invention will be described in detail by way of example on the basis of an embodiment example. Note that dimensions, materials, shapes, relative positioning, and the like of components described in each of embodiments are to be appropriately changed in accordance with configurations of an apparatus and a device to which the invention is applied and various conditions, and are therefore not intended to limit the scope of the invention to the following embodiments.

First Embodiment

(1) Image Forming Apparatus 100

FIG. 1 is a schematic cross-sectional view showing an outline of the configuration of an image forming apparatus 100 of a first embodiment of the present invention, which uses an electrophotographic recording technique. The image forming apparatus 100 shown in FIG. 1 is a laser printer, which forms images on a recording material P using an electrophotographic system.

When the image forming apparatus 100 receives a print signal, a scanner unit 21 emits a laser beam modulated according to the image information and scans the surface of a photosensitive drum (electrophotographic photosensitive member) 19 charged to a predetermined polarity by a charging roller 16. The scanner unit 21 includes a light source 22, a polygon mirror 23, and a reflecting mirror 24. A laser beam emitted from the light source 22 is directed to the photosensitive drum 19 via the polygon mirror 23 and the reflecting mirror 24, forming an electrostatic latent image on the photosensitive drum 19 serving as an image carrying member. Toner that is charged with a predetermined polarity is supplied to the electrostatic latent image from a developing roller 17, developing the electrostatic latent image on the photosensitive drum 19 into a toner image (developer image) corresponding to the image information. Meanwhile, a recording material (recording paper) P stacked in a paper feed cassette 11 is fed one by one by a pickup roller 12 and conveyed by a pair of conveyance rollers 13 toward a pair of resist rollers 14. The recording material P is conveyed from the resist rollers 14 to the transfer position, which is formed by the photosensitive drum 19 and a transfer roller 20 serving as a transfer member, at the time when the toner image on the photosensitive drum 19 reaches the transfer position. The toner image on the photosensitive drum 19 is transferred to the recording material P as the recording material P moves through the transfer position. The apparatus configuration that performs the process until the formation of the unfixed toner image on the recording material P corresponds to an image forming portion of the present invention.

The recording material P is then heated by the heat of a heater in a fixing apparatus (image heating apparatus) 200 as a fixing portion (image heating portion), so that the toner image is heated and fixed to the recording material P. The recording material P carrying the fixed toner image is discharged to a tray above the image forming apparatus 100 by pairs of conveyance rollers 26 and 27.

A drum cleaner 18 cleans the photosensitive drum 19 by removing residual toner from the surface of the photosensitive drum 19. A motor 30 drives the fixing apparatus 200 and the like. Power is supplied to the fixing apparatus 200 from a control circuit 402 as an energization control portion connected to a commercial AC power supply 401.

In this embodiment, the developing unit, which includes the photosensitive drum 19, the charging roller 16, and the developing roller 17, and the cleaning unit, which includes the drum cleaner 18, form a process cartridge 15, which is attachable to and detachable from the apparatus main body of the image forming apparatus 100.

The above image forming apparatus is described using a representative example of a monochrome laser printer with monochrome toner, but the present invention is not limited to this. For example, the present invention is applicable to a tandem color laser printer for forming images by transferring color toner of two or more colors onto a recording material through an intermediate transfer belt.

(2) Fixing Apparatus 200

Figure 2:
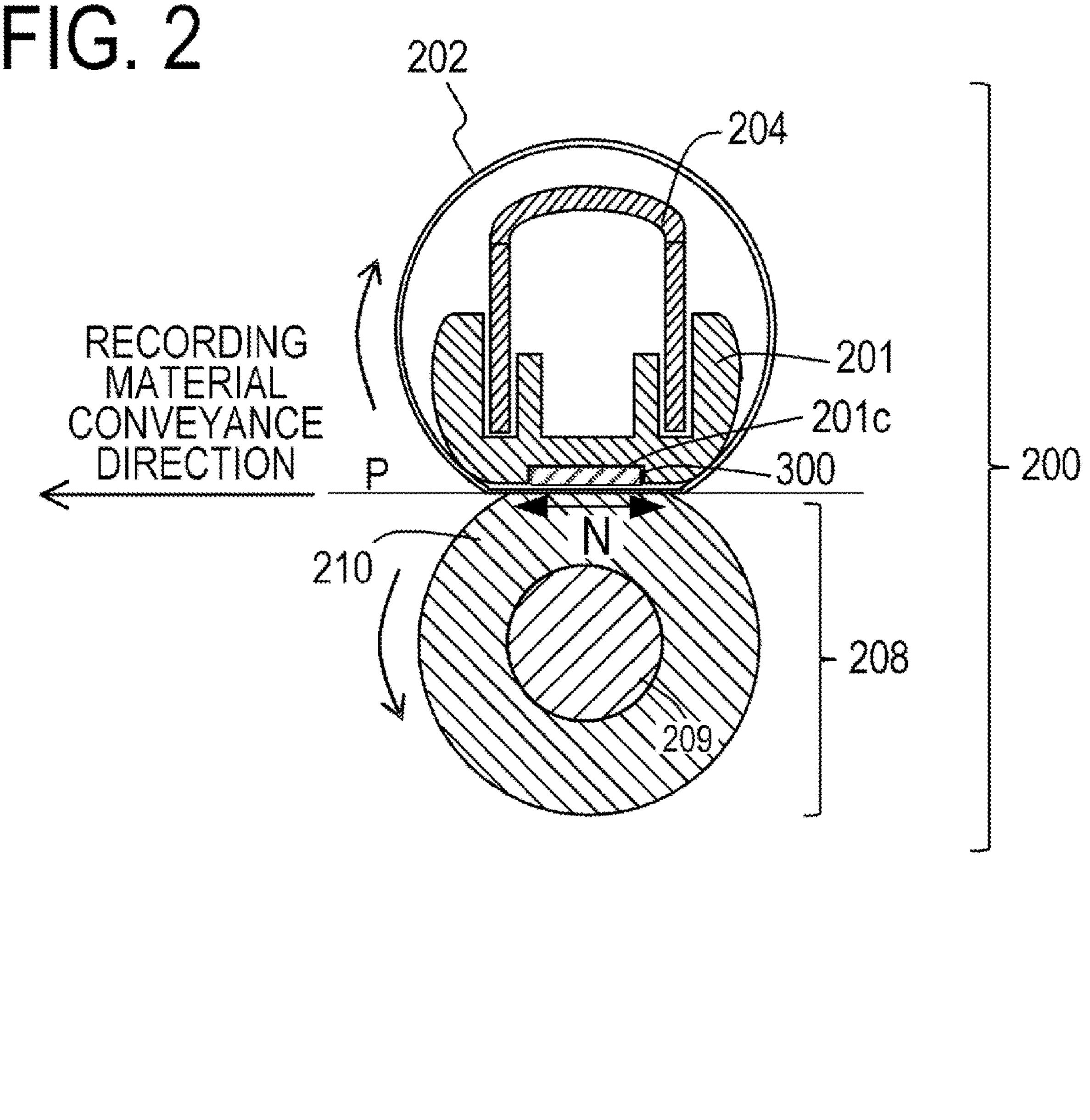
FIG. 2 is a cross-sectional view of an image heating apparatus according to the first embodiment of the present invention.

FIG. 2 is a schematic cross-sectional view showing an outline of the configuration of the fixing apparatus 200 of the first embodiment. The fixing apparatus 200 includes a tubular film 202, which is a heating rotating member, a heater 300, which is in contact with the inner surface of the film 202, a pressure roller 208, which is a pressure rotating member that is in contact with the outer surface of the film 202 and forms a fixing nip portion N between the pressure roller 208 and the film 202 together with the heater 300, and a metal stay 204. The heater 300, which is disposed inside the film 202 (inner space of the film 202, which is a region facing the inner circumference surface of the film 202), and the pressure roller 208, which is disposed outside the film 202 (region facing the outer circumference surface of the film 202) form the fixing nip portion N between the film 202 and the pressure roller 208.

The film 202 is a multilayer heat-resistant film formed in a tubular shape. The material of the base layer of the film 202 is a heat-resistant resin, such as polyimide, or a metal, such as stainless steel. To prevent toner adhesion and ensure the separation from the recording material P, the surface of the film 202 is coated with a heat-resistant resin with high releasability, such as a fluoropolymer, to form a release layer. Furthermore, to improve the image quality, an elastic layer, which is of heat-resistant rubber such as silicone rubber, may be formed between the base layer and the release layer. The pressure roller 208 includes a core bar 209, which is made of iron, aluminum, or the like, and an elastic layer 210, which is made of silicone rubber or the like. Additionally, a release layer, which may be a tube or coating of a fluoropolymer, may be provided on the elastic layer. A heater holder 201, which is a heater holding member made of a heat-resistant resin such as liquid crystal polymer, holds the heater 300. The heater 300 heats the fixing nip portion N to heat the film 202. The heater holder 201 includes a heater accommodation portion 201*c*, which holds the heater 300 and has the shape of a recess. The heater accommodation portion 201*c* is located on the side facing the inner surface of the film 202 and extends in the longitudinal direction of the film 202. The heater holder 201 also includes convex film guide curved surfaces for guiding the inner surface of the film 202 on opposite sides of the heater accommodation portion 201*c* in the conveyance direction of the recording material P (the direction of rotation of the film 202). That is, the heater holder 201 also has a guide function of guiding the rotation of the film 202. The heater 300 includes contacts (not shown) that are in contact with power supply connectors (not shown) of the heater holder 201 on the side opposite to the side where the fixing nip portion N is formed. Power is supplied to the heater 300 through these contacts. A metal stay 204 receives a pressurizing force from a spring (not shown) and presses the heater holder 201 toward the pressure roller 208. The metal stay 204 also serves to reinforce the heater holder 201 and heater 300.

The pressure roller 208 receives a driving force from the motor 30 shown in FIG. 1 and rotates in the direction of the arrow. As the pressure roller 208 rotates, the film 202 is driven to rotate. The recording material P carrying an unfixed toner image is heated while being held and conveyed in the fixing nip portion N to be fixed.

(3) Heater 300 and Heater Holder 201

Figure 3:
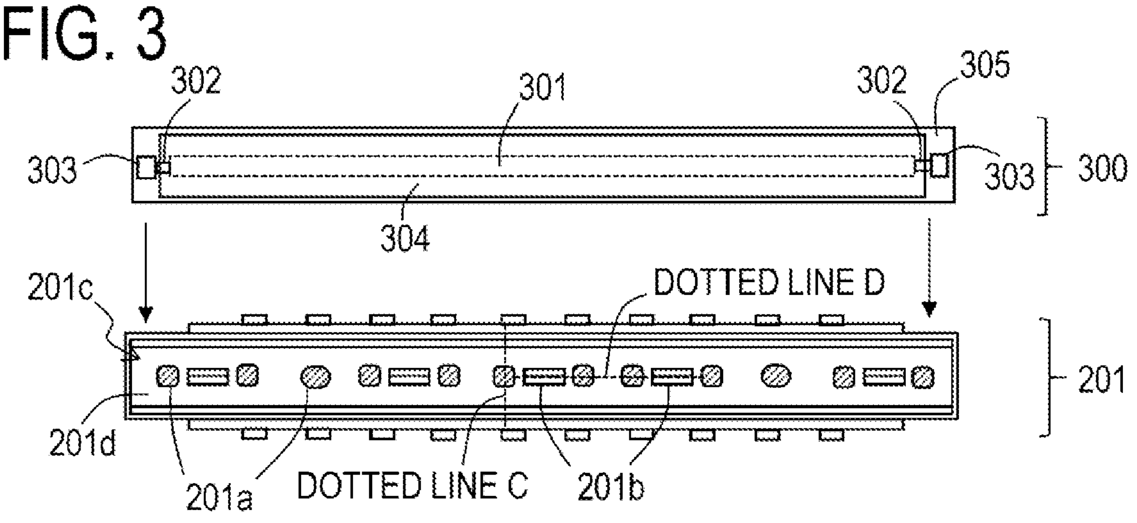
FIG. 3 is a diagram of a heater and a heater holder of the first embodiment of the present invention.

FIG. 3 is a schematic view showing the configurations of the heater holder 201 and the heater 300. For the sake of explanation, the heater 300 is removed from the heater holder 201. Both are shown as viewed from the side corresponding to the fixing nip portion N in FIG. 2.

The heater 300 has a ceramic substrate 305, a heating element 301, conductors 302, and electrodes 303. The heating element 301 is disposed on the substrate 305 and generates heat when supplied with power. The electrodes 303 connect the conductors 302 to power supply connectors (not shown) provided on the heater holder 201 to supply power to the heating element 301. Also, a surface protection layer 304, which is made of glass, is provided on the substrate 305 to protect the heating element 301 and the conductors 302.

The heater 300 has a surface (first surface) as a slide-side surface that faces the inner surface of the film 202 and on which the heating element 301 and the conductors 302 are mounted. The surface protection layer 304 covers this surface. The opposite surface (second surface) of the heater 300, which is the back surface opposite to the side facing the inner surface of the film 202, is provided with contacts (not shown) that are in contact with power supply connectors (not shown) provided on the heater holder 201. An insulating protection layer, which may be made of glass, covers this surface in a manner that exposes the contacts. These contacts connect the electrodes 303 to the power supply connectors of the heater holder 201.

Multiple heater adhesion portions 201*a*, which are indicated by diagonal lines, are arranged in the heater longitudinal direction on a bottom surface 201*d* of the heater accommodation portion 201*c* of the heater holder 201. Each adhesion portion 201*a* preferably has an area of about 20 to 50 $mm^2$ and has the shape of a circle or an ellipse with a diameter of about 6 mm, or a polygon or quadrangle of the same size. For example, two adjacent heater adhesion portions 201*a* may be spaced apart in the heater longitudinal direction, or they may be connected. In this embodiment, each heater adhesion portion 201*a* has an area of about 30 $mm^2$. The area of the heater adhesion portion 201*a* is not limited to the above range and may be adjusted according to the width of the heater 300 or the heater holder 201. The present embodiment has one row of heater adhesion portions 201*a* arranged in the longitudinal direction of the heater 300, but a configuration including multiple rows may also be used.

The longitudinal direction of the heater 300 (the substrate 305) agrees with the longitudinal direction of the film 202 (the direction along the central axis of the tubular shape), the longitudinal direction of the pressure roller 208 (the direction of the rotation axis), and the width direction of the recording material P perpendicular to the conveyance direction of the recording material P.

An adhesive is applied to the multiple heater adhesion portions 201*a* of the heater accommodation portion 201*c* of the heater holder 201, and the heater 300 is accommodated in the heater accommodation portion 201*c* such that the back surface of the heater 300 is pressed against the bottom surface 201*d* of the heater accommodation portion 201*c*. As a result, the back surface of the heater 300 adheres to the bottom surface 201*d* of the heater accommodation portion 201*c* via the adhesive, so that the heater 300 is fixed to and supported by the heater holder 201. The applied adhesive is preferably a heat-resistant silicone rubber-based adhesive. The optimum amount of adhesive per heater adhesion portion 201*a* is about 10 to 20 mg, but the amount is not limited to this. In this embodiment, 13 mg of adhesive is applied to each heater adhesion portion 201*a*.

The bottom surface 201*d* of the heater accommodation portion 201*c* of the heater holder 201 has multiple holes 201*b*. These holes 201*b* are holes for placing thermistors (not shown) that are in contact with the back side of the heater 300 to detect the temperature of the heater. The heater holder 201, the heater 300, and the thermistors will be described in detail below.

(4) Heater Adhesion Portion 201*a*

Figure 4A:
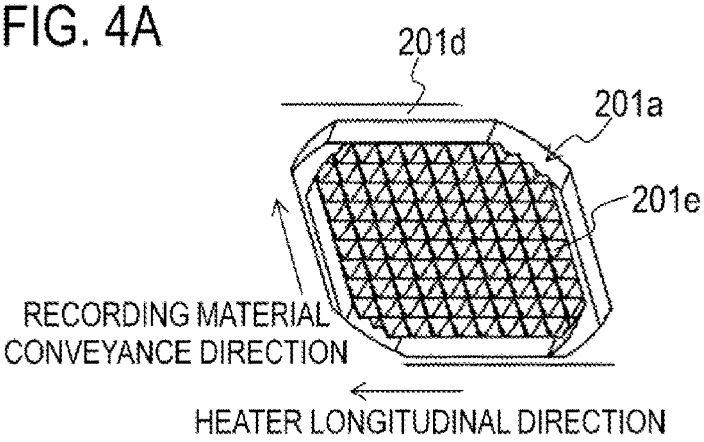
FIGS. 4A to 4E are diagrams of a heater adhesion portion of the first embodiment of the present invention.
Figure 4B:
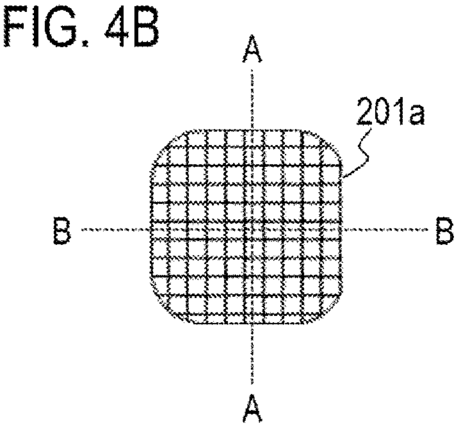
Figure 4C:
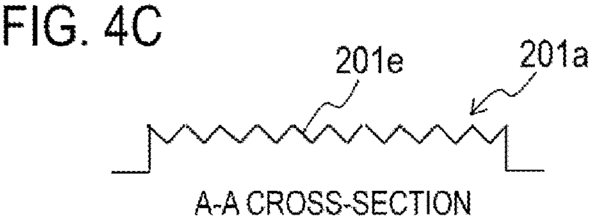
Figure 4E:
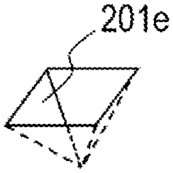
Figure 4D:
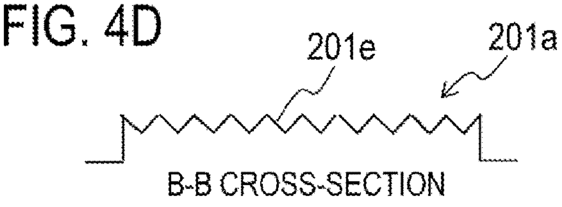

Referring to FIGS. 4A to 4E, the heater adhesion portions 201*a* of the present embodiment are now described in detail. FIG. 4A is a perspective view of a heater adhesion portion 201*a*. FIG. 4B is a plan view of the heater adhesion portion 201*a* as viewed in the direction facing the heater 300. FIG. 4C is a schematic cross-sectional view showing the cross-sectional configuration of the heater adhesion portion 201*a* taken along dotted line A-A in FIG. 4B in the recording material conveyance direction. FIG. 4D is a schematic cross-sectional view showing the cross-sectional configuration of the heater adhesion portion 201*a* taken along dotted line B-B in FIG. 4B in the heater longitudinal direction. FIG. 4E is a schematic perspective view showing the three-dimensional shape of one of multiple recessed portions 201*e* forming the heater adhesion portion 201*a*.

The surface property of the heater adhesion portion 201*a* of the present embodiment is characterized by projections and recesses arranged both in the recording material conveyance direction and in the heater longitudinal direction. One hole-shaped recessed portion 201*e* is separated from the adjacent recessed portions 201*e*. That is, focusing on one recessed portion 201*e*, the recessed portion 201*e* is surrounded by side walls and is thus independent of the surrounding adjacent recessed portions 201*e*. When the same recessed portions 201*e* are arranged in rows and columns in the same size, the surface shape of the heater adhesion portion 201*a* is an uneven shape in which the recessed portions 201*e* are independently arranged as shown in FIG. 4A.

As shown in FIG. 4E, each recessed portion 201*e* has the shape of an inverted square pyramid with a base edge of 500 μm and a depth of about 150 μm. That is, each recessed portion 201*e* has the shape of a hole that has a rectangular opening with a side of 500 μm and becomes narrower with increasing depth. Optimum dimensions of this single square pyramid may preferably include a depth of about 50 μm to 300 μm and a base edge of about 200 μm to 1000 μm. This is to ensure that the adhesive applied to the surface of the heater adhesion portion 201*a* appropriately enters the recessed portions.

In this embodiment, the projections and recesses are formed by the shape of recessed portions each having the shape of an inverted square pyramid as a representative example. However, the shape of recessed portions that achieves the advantageous effects described below in the same manner is not limited to this. Other shapes will be described below as application examples of the embodiment.

(5) Advantageous Effects of Invention

The reasons that the shape of the heater adhesion portion 201*a* of the present embodiment is advantageous in limiting the peeling of the heater are described in turn below. First, the factors that tend to cause heater peeling are described.

Factors of Heater Peeling

FIG. 5A is a schematic cross-sectional view of the heater holder 201 taken along dotted line C in FIG. 3 in the recording material conveyance direction. FIG. 5A shows the heater 300, the heater adhesive 400, a heater adhesion portion 201*a* of the heater holder 201, the film 202, and the pressure roller 208. For the sake of explanation of the factors of heater peeling, FIGS. 5A to 5C simply show the surface shape of the adhesion portion 201*a* as a flat shape without projections or recesses.

Referring to FIG. 5A, a force acting in the recording material conveyance direction is now described. When the fixing apparatus 200 is in operation, the film 202 rotates in the direction of arrow F due to the frictional force from the pressure roller 208. Similarly, the film 202 rotates in the direction of the arrow when the recording material is being fed. At this time, the heater 300 receives a force in the direction of arrow H caused by a force due to friction with the rotating film 202. When the heater 300 receives the force in the direction of arrow H, a force S in the same direction also acts on the adhesive 400 between the heater 300 and heater holder 201. When heated to a high temperature, the heater 300 expands and applies forces in the directions indicated by dotted lines (arrows Bj and Bk) on the upstream side and the downstream side of the conveyance direction of the heater 300. These forces return to the direction of release when the driving of the fixing apparatus 200 is stopped and the energization of the heater 300 is turned off. That is, as the fixing apparatus 200 repeats activation and deactivation, the adhesive 400 of the heater adhesion portion 201*a* is continuously and repeatedly subjected to stress in the directions of expansion and contraction (dotted line arrows Gj and Gk).

FIG. 5B a schematic cross-sectional view of the heater holder 201 taken along dotted line D in FIG. 3 in the heater longitudinal direction. FIG. 5C is an enlarged view of the section surrounded by a dotted line in FIG. 5B. In addition to the heater 300, the film 202, and the pressure roller 208, FIG. 5B shows thermistors 250 that are in contact with the back surface of the heater 300 to detect the temperature of the heater 300. The force acting in the heater longitudinal direction is now described with reference to FIG. 5B. In also the heater longitudinal direction, the heater 300 heated to a high temperature expands longitudinally (arrows B1 and Br). The repeated activation and deactivation of the fixing apparatus 200 also repeatedly apply stress caused by expansion and contraction (dotted line arrows G1 to G4) to the adhesive 400.

As shown in FIG. 5C, when the repeated stress caused by expansion and contraction described above is continuously applied for a long period of use, a part of the heater adhesion portion 201*a* may be partially peeled off from the adhesive 400. This phenomenon can occur both in the recording material conveyance direction shown in FIG. 5A and in the heater longitudinal direction shown in FIG. 5B.

Additionally, the peeling of the adhesive 400 may be facilitated by the action described below. While the apparatus is turned on or in the operation state, a spring (not shown) urges the heating member (film unit) including the film 202, the heater holder 201, and the heater 300 against the pressure roller 208 with a predetermined pressurizing force, thereby forming the fixing nip portion N. While the power is off or when a paper jam occurs while the recording material P passes through the fixing nip portion N, the pressurizing force may be released, so that the heating member (film unit) is held spaced apart from the pressure roller 208. That is, the heater 300 and the pressure roller 208 are configured to be movable relative to each other to reduce or cancel the pressing force forming the fixing nip portion N.

FIG. 6A is a schematic cross-sectional view generally showing a state in which the fixing apparatus 200 is held in a separated state. FIG. 6B is a schematic cross-sectional view showing the vicinity of heater adhesion portions 201*a* in a separated state as viewed in the heater longitudinal direction shown in FIG. 5B. In the separated state shown in FIGS. 6A and 6B, the pressurizing force forming the fixing nip portion N is not applied to the pressure roller 208, so that the heater 300 does not receive a reaction force corresponding to the pressurizing force from the pressure roller 208. Generally, temperature detection elements, such as thermistors 250, and a safety element, such as a thermoswitch, are urged against the back surface of the heater 300 with a predetermined pressurizing force. This is to increase the accuracy in detecting the temperature of the heater 300. As shown in FIG. 6B, since the urging force Fth of the thermistors 250 is applied to the back surface of the heater 300, a force acts to separate the heater 300 from the heater holder 201. As a result, as shown in FIG. 6C, when the adhesive 400 is partially peeled off at the edges of the adhesion portion 201*a*, an action occurs that further peels off the adhesive 400.

The force acting on the adhesion portion 201*a* may be summarized as follows. First, the repetitive stress caused by the thermal expansion and contraction of the heater described with reference to FIGS. 5A to 5C is applied to the adhesion portion 201*a*. Additionally, when the heating member (film unit) is separated as described with reference to FIGS. 6A to 6C, the thermistors 250 and the like apply an urging force to the back surface of the heater 300 in a direction that peels off the heater 300. The combination of these two actions leads to heater peeling.

Figure 7:
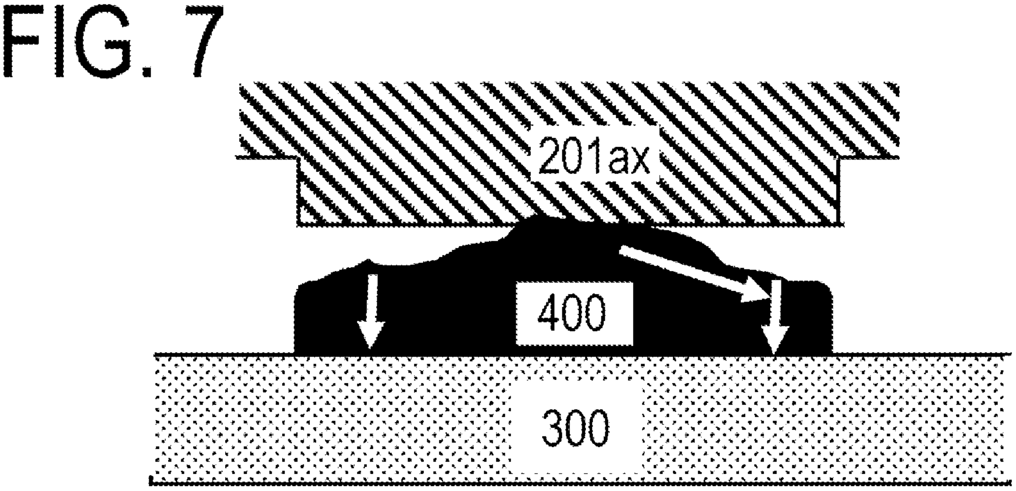
FIG. 7 is an explanatory diagram of a comparative example.

With reference to FIG. 7, a description is given below as to how the heater peeling progresses in a heater adhesion portion 201*ax* of a comparative example that does not have projections or recesses. When repetitive stress due to thermal contraction or the like causes slight heater peeling at the edges of the adhesion portion, the elasticity of the adhesive 400, which is mainly made of silicone rubber, causes the sections that are peeled off to pull the adjacent rubber portion by elastic forces (indicated by arrows). When such pulling forces act, the sections in which heater peeling is occurring pull the adhesion portion, thereby gradually increasing the peeling. This causes the progress of heater peeling in a chain reaction. In another comparative configuration example of the heater adhesion portion, the adhesion surface has a groove extending in one of the heater longitudinal direction or the recording material conveyance direction. In this configuration, the above peeling force still acts in a chain reaction in the direction along the groove. This eventually causes the progress of peeling.

Advantageous Effects of Present Embodiment

Figure 8:
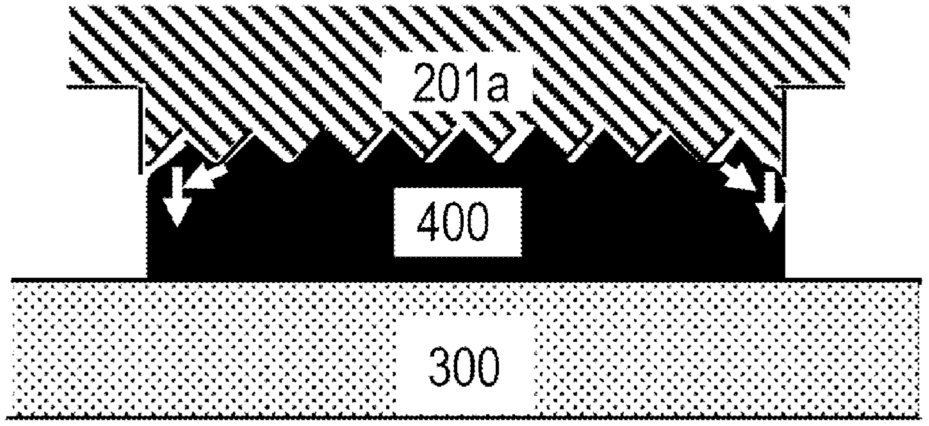
FIG. 8 is a diagram illustrating the advantageous effects of the first embodiment of the present invention.

The advantageous effects of the present embodiment are now described. In the present embodiment, the surface of the heater adhesion portion 201*a* has projections and recesses arranged in the recording material conveyance direction and in the heater longitudinal direction. Each recessed portion 201*e* is independent of and separated from the adjacent recessed portions 201*e*. This embodiment has the following three advantages. (i) As compared to a flat heater adhesion portion and a heater adhesion portion having a groove in one direction such as the comparative examples, the present embodiment allows the area of the adhesion surface to be increased, achieving an improved adhesion force as a result of the larger surface area. (ii) The adhesive 400 enters the recessed portions 201*e* having an increased surface area, so that the adhesive 400 is anchored to the heater adhesion portions 201*a*, thereby increasing the adhesion force. (iii) The recessed portions 201*e* are independent of and separated from one another as shown in FIG. 8. Thus, when peeling partially occurs as shown in FIG. 7, the force that elastically pulls the adhesion portion is disrupted, preventing the progress of adhesive peeling in a chain reaction. This effect is achieved in both the heater longitudinal direction and the recording material conveyance direction since the projections and recesses are arranged in these directions, thereby increasing the adhesion force and preventing the progress of peeling in a chain reaction.

Table 1 below shows a comparison and differences in heater adhesion force of one heater adhesion portion of the structures of the comparative example and the first embodiment. Additionally, when a life and endurance test was performed using an image forming apparatus with a process speed of 210 mm/sec and 40 PPM with A4 longitudinal feed, the numbers of A4 sheets fed before heater peeling occurred were compared.

TABLE 1

Comparison Between Comparative Examples and First Embodiment

| | Adhesion portion surface configuration | Adhesion force | Durable number of sheets |
|---|---|---|---|
| Comparative Example 1 | Smooth flat surface | 10N | Peeling occurred after about 100K sheets |
| Comparative Example 2 | Groove formed in heater longitudinal direction | 15N | Peeling occurred after about 150K sheets |
| Comparative Example 3 | Groove formed in recording material conveyance direction | 13N | Peeling occurred after about 140K sheets |
| First Embodiment | Projections and recesses formed with recessed portions separated from one another | 25N | No peeling occurred after 300K sheets |

(6) Other Application Examples of Present Embodiment

The surface shape of the heater adhesion portion that can provide the same advantageous effects as the present embodiment is not limited to the form described with reference to FIGS. 4A to 4E. FIGS. 9A to 9H show application forms of the recessed portion 201*e* of the first embodiment.

Figure 9A:
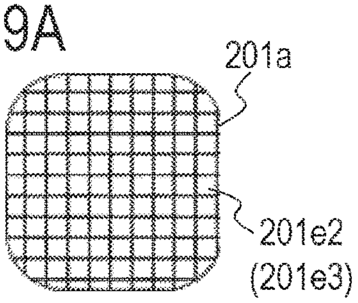
FIGS. 9A to 9H are diagrams of other application forms of the first embodiment of the present invention.
Figure 9B:
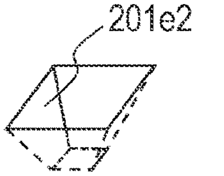
Figure 9C:
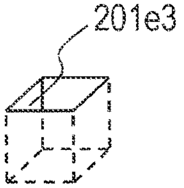

FIG. 9A is a plan view of a heater adhesion portion 201*a* including recessed portions 201*e*2 of Application Example 1 and recessed portions 201*e*3 of Application Example 2 as viewed in the direction facing the heater 300. FIG. 9B is a schematic perspective view showing the three-dimensional shape of one of multiple recessed portions 201*e*2 of Application Example 1 forming the heater adhesion portion 201*a*. FIG. 9C is a schematic perspective view showing the three-dimensional shape of one of multiple recessed portions 201*e*3 of Application Example 2 forming the heater adhesion portion 201*a*. As shown in FIGS. 9A to 9C, projections and recesses may be configured such that the three-dimensional shape of an individual recessed portion of the multiple recessed portions forming the heater adhesion portion 201*a* is a three-dimensional shape of a rectangular solid or a trapezoid.

Figure 9D:
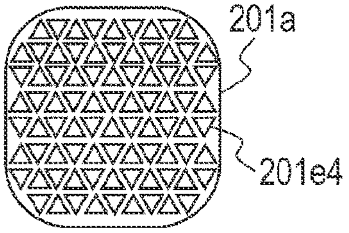
Figure 9E:
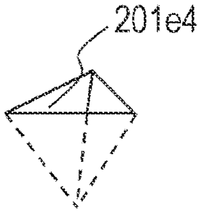

FIG. 9D is a plan view of a heater adhesion portion 201*a* including recessed portions 201*e*4 of Application Example 3 as viewed in the direction facing the heater 300. FIG. 9E is a schematic perspective view showing the three-dimensional shape of one of multiple recessed portions 201*e*4 of Application Example 3 forming the heater adhesion portion 201*a*. As shown in FIGS. 9D and 9E, an individual recessed portion of the multiple recessed portions forming the heater adhesion portion 201*a* may be shaped as a triangular pyramid, and the projections and recesses may be formed by arranging the recessed portions.

Figure 9F:
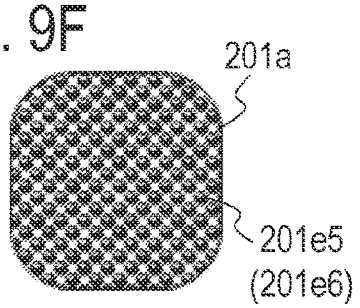
Figure 9G:
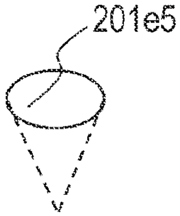
Figure 9H:
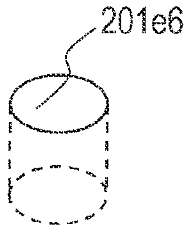

FIG. 9F is a plan view of a heater adhesion portion 201*a* including recessed portions 201*e*5 of Application Example 4 and recessed portions 201*e*6 of Application Example 5 as viewed in the direction facing the heater 300. FIG. 9G is a schematic perspective view showing the three-dimensional shape of one of multiple recessed portions 201*e*5 of Application Example 4 forming the heater adhesion portion 201*a*. FIG. 9H is a schematic perspective view showing the three-dimensional shape of one of multiple recessed portions 201*e*6 of Application Example 5 forming the heater adhesion portion 201*a*. As shown in FIGS. 9F to 9H, an individual recessed portion of the multiple recessed portions forming the heater adhesion portion 201*a* may have the shape of a cone or a cylinder without causing any problems.

The recessed portions of the above application examples have the same advantageous effects as long as adjacent recessed portions are independent of and separated from one another. Furthermore, the adhesion surface of an individual heater adhesion portion 201*a* may be formed by any combination of the recessed portions 201*e* of the above embodiment and the recessed portions 201*e*2 to 201*e*6 of Application Examples 1 to 5.

Second Embodiment

A second embodiment of the present invention is now described. Here, only the aspects of the second embodiment that differ from the first embodiment are described. The configuration of the second embodiment that is not specifically described below is the same as that of the first embodiment.

Figure 10A:
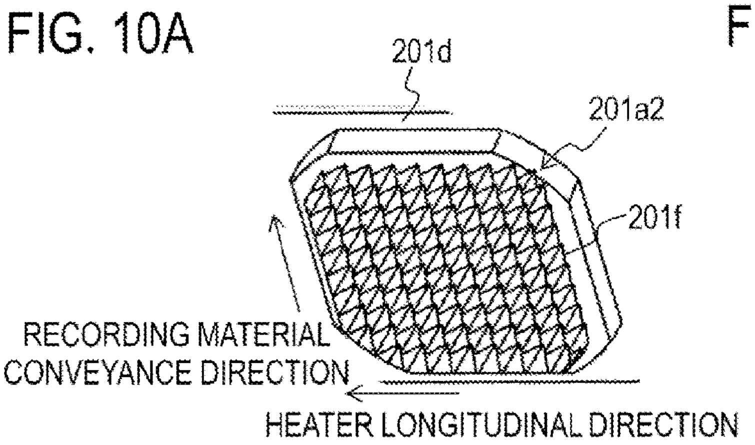
FIGS. 10A to 10E are diagrams of a heater adhesion portion of a second embodiment of the present invention.
Figure 10B:
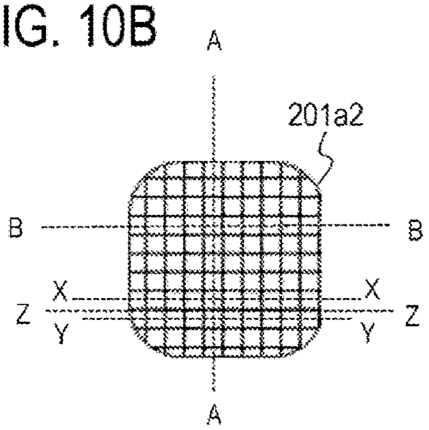
Figure 10C:
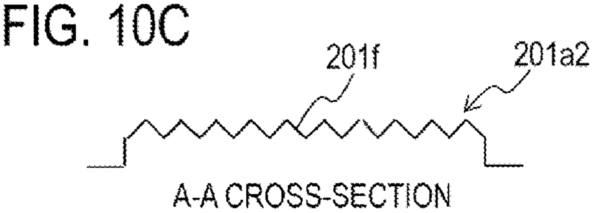
Figure 10E:
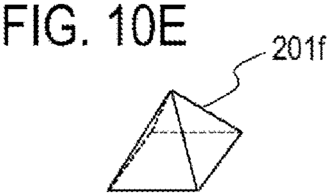
Figure 10D:
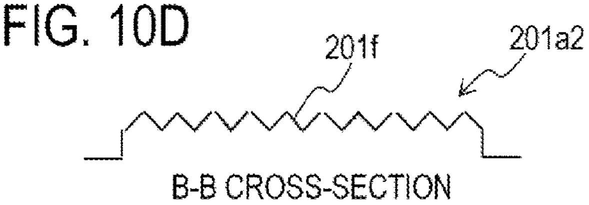

FIG. 10A is a perspective view of a heater adhesion portion 201*a*2. FIG. 10B is a plan view of the heater adhesion portion 201*a*2 as viewed in the direction facing the heater 300. FIG. 10C is a schematic cross-sectional view showing the cross-sectional configuration of the heater adhesion portion 201*a*2 taken along dotted line A-A in FIG. 10B in the recording material conveyance direction. FIG. 10D is a schematic cross-sectional view showing the cross-sectional configuration of the heater adhesion portion 201*a*2 taken along dotted line B-B in FIG. 10B in the heater longitudinal direction. FIG. 10E is a schematic perspective view showing the three-dimensional shape of one of multiple projecting portions 201*f* forming the heater adhesion portion 201*a*2.

In the first embodiment, the projections and recesses of the surface of the heater adhesion portion 201*a* are formed by arranging the hole-shaped recessed portions 201*e*. In contrast, in the second embodiment, the projections and recesses of the surface of the heater adhesion portion 201*a*2 are formed by arranging multiple crest-shaped projecting portions 201*f* as shown in FIG. 10A.

With the uneven shape of the first embodiment formed by the recessed portions 201*e*, the recessed portions 201*e* are surrounded by walls and independent of one another. In contrast, with the uneven shape of the second embodiment formed by the projecting portions 201*f*, a recessed portion formed between adjacent projecting portions 201*f* is continuous with a recessed portion formed between other adjacent projecting portions 201*f*. As shown in FIGS. 4A and 10A, the section of the heater adhesion portion that has the uneven shape is formed in an accommodation recessed portion that is further recessed from the bottom surface 201*d* of the heater accommodation portion 201*c* of the heater holder 201. The outer periphery of the accommodation recessed portion is surrounded by a groove portion. With the uneven shape of the second embodiment formed by the projecting portions 201*f*, the recessed portions between adjacent projecting portions 201*f* are open to the groove portion at the sides.

The heater adhesion portion 201*a*2 of the present embodiment includes projecting portions 201*f* arranged in the longitudinal direction and in the recording material conveyance direction. As shown in FIG. 10E, each projecting portion 201*f* has the shape of a square pyramid having a side of 500 μm and a height of 200 μm.

With the hole-shaped recessed portions 201*e* of the first embodiment, it may be difficult for the adhesive interposed between the heater 300 and the heater adhesion portion 201*a* to reach the bottom of each recessed portion 201*e*. This tends to be true especially when the adhesive used has a large surface tension or when the surface of the adhesion portion has low wettability.

In contrast, when the projections and recesses are formed by multiple projecting portions 201*f* as in the second embodiment, the interposed adhesive is likely to spread lengthwise and crosswise, so that the adhesive is sufficiently spread over the entire area. In the second embodiment, the vertices of the crest-shaped projecting portions 201*f* are connected to form projections and recesses as shown in FIGS. 10C and 10D. Thus, in the same manner as FIG. 8 of the first embodiment, even when peeling partially occurs at a portion of the adhesion portion, the progress of peeling in a chain reaction is prevented. In the cross-section taken along line Z-Z in FIG. 10B, the valleys are continuously connected. However, since this cross-section is located between the cross-sections of line X-X and line Y-Y in which projections and recesses are connected, the valleys along line Z-Z do not cause the progress of peeling in a chain reaction. As in the first embodiment, the adhesion force and the durability after paper feeding were verified. The adhesion force was 24 N, and an advantageous effect equivalent to that of the first embodiment was obtained. Also, the adhesion portion was not peeled off after an endurance test of feeding 300,000 sheets, indicating that the sufficient adhesion force is maintained for a long period of use.

Other Application Examples of Second Embodiment

FIGS. 11A to 11I show application examples of the projecting portions 201*f* of the second embodiment. As in the first embodiment, the three-dimensional shape of the crest-shaped projecting portions forming the heater adhesion portion 201*a*2 of the second embodiment is not limited to the shape of a square pyramid.

Figure 11A:
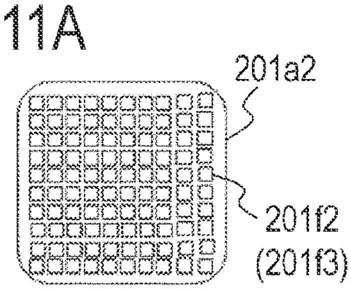
FIGS. 11A to 11I are diagrams of other application forms of the second embodiment of the present invention.
Figure 11B:
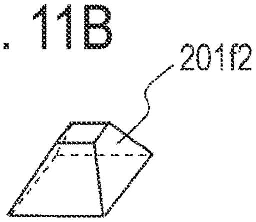
Figure 11C:
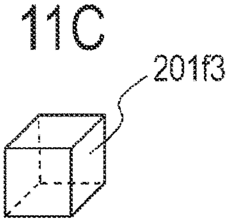

FIG. 11A is a plan view of a heater adhesion portion 201*a*2 including projecting portions 201*f*2 of Application Example 1 and projecting portions 201*f*3 of Application Example 2 as viewed in the direction facing the heater 300. FIG. 11B is a schematic perspective view showing the three-dimensional shape of one of multiple projecting portions 201*f*2 of Application Example 1 forming the heater adhesion portion 201*a*2. FIG. 11C is a schematic perspective view showing the three-dimensional shape of one of multiple projecting portions 201*f*3 of Application Example 2 forming the heater adhesion portion 201*a*. As shown in FIGS. 11A to 11C, the three-dimensional shape of an individual projecting portion of the multiple projecting portions forming the heater adhesion portion 201*a*2 may be a three-dimensional shape of a trapezoid or a rectangular solid.

Figure 11D:
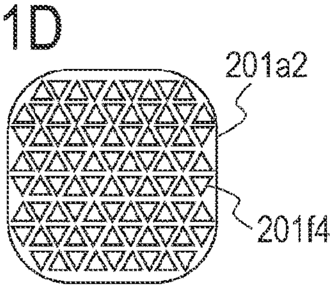
Figure 11E:
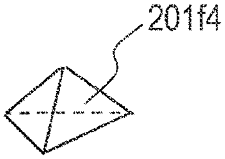

FIG. 11D is a plan view of a heater adhesion portion 201*a*2 including projecting portions 201*f*4 of Application Example 3 as viewed in the direction facing the heater 300. FIG. 11E is a schematic perspective view showing the three-dimensional shape of one of multiple projecting portions 201*f*4 of Application Example 3 forming the heater adhesion portion 201*a*2. As shown in FIGS. 11D and 11E, an individual projecting portion of the multiple projecting portions forming the heater adhesion portion 201*a*2 may be shaped as a triangular pyramid, and the projections and recesses may be formed by arranging the projecting portions.

Figure 11F:
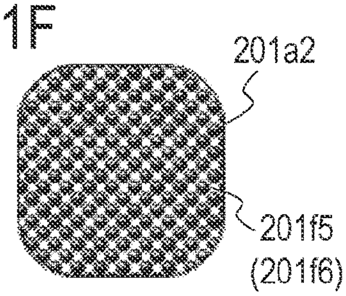
Figure 11G:
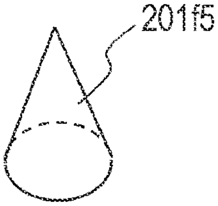
Figure 11H:
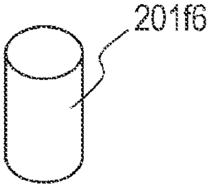

FIG. 11F is a plan view of a heater adhesion portion 201*a*2 including projecting portions 201*f*5 of Application Example 4 and projecting portions 201*f*6 of Application Example 5 as viewed in the direction facing the heater 300. FIG. 11G is a schematic perspective view showing the three-dimensional shape of one of multiple projecting portions 201*f*5 of Application Example 4 forming the heater adhesion portion 201*a*2. FIG. 11H is a schematic perspective view showing the three-dimensional shape of one of multiple projecting portions 201*f*6 of Application Example 5 forming the heater adhesion portion 201*a*2. As shown in FIGS. 11F to 11H, an individual projecting portion of the multiple projecting portions forming the heater adhesion portion 201*a*2 may have the shape of a cone or a column.

The adhesion surface of a heater adhesion portion 201*a*2 may be formed by any combination of the projecting portions 201*f* of the second embodiment and the projecting portions 201*f*2 to 201*f*6 of Application Examples 1 to 5 described above.

Figure 11I:
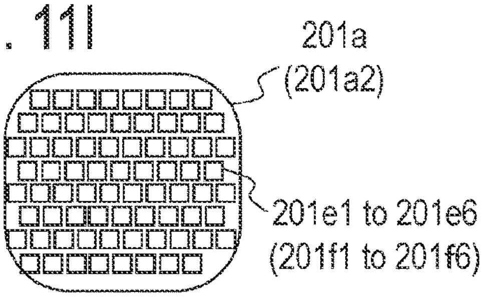

Furthermore, as shown in FIG. 11I, the projecting portions may be arranged in a staggered arrangement. The staggered arrangement refers to a state in which, with respect to the arrangement of projecting portions in the longitudinal direction or in the paper conveyance direction, one row is offset from the adjacent rows. This arrangement is free of a part in which valleys are continuous as in the configuration described above, effectively preventing adhesion peeling. This staggered arrangement may also be applied to the arrangement of the recessed portions in the first embodiment.

The multiple heater adhesion portions provided in the heater holder may include a combination of the heater adhesion portion 201*a* of the first embodiment and the heater adhesion portion 201*a*2 of the second embodiment. Also, an individual heater adhesion portion of the multiple heater adhesion portions may include a combination of the recessed portions of the first embodiment and the projecting portions of the second embodiment. That is, the configurations of the above embodiments may be freely combined to the extent that does not cause technical contradiction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-065608, filed on Apr. 12, 2022, which is hereby incorporated by reference herein in its entirety.

What is claimed is:

1. An image heating apparatus comprising:

a tubular film;

a heater disposed in an inner space of the film;

a roller that is in contact with an outer surface of the film and forms a nip between the roller and the film together with the heater; and a holder including an adhesion portion to which the heater adheres through an adhesive, the holder supporting the heater, wherein the image heating apparatus is configured to heat, using heat of the heater, an image formed on a recording material held and conveyed by the nip in a case where the roller rotates, wherein the adhesion portion includes a surface having an uneven shape of projections and recesses repeating in each of a conveyance direction of the recording material and a longitudinal direction of the heater perpendicular to the conveyance direction, and wherein a depth of the projections and recesses is 50 μm to 300 μm.

2. The image heating apparatus according to claim 1, wherein the uneven shape is formed by a plurality of recessed portions arranged in each of the conveyance direction and the longitudinal direction.

3. The image heating apparatus according to claim 2, wherein the recessed portions are separated from the adjacent recessed portions by side walls.

4. The image heating apparatus according to claim 2, wherein the adhesion portion is one of a plurality of adhesion portions arranged in the longitudinal direction.

5. The image heating apparatus according to claim 1, wherein the uneven shape is formed by a plurality of projecting portions arranged in each of the conveyance direction and the longitudinal direction.

6. The image heating apparatus according to claim 1, wherein the projections and recesses are arranged in a staggered manner such that positions of the projections and recesses in a row of the repeating projections and recesses in the conveyance direction are offset in the conveyance direction from positions of the projections and recesses in other rows that are adjacent in the longitudinal direction.

7. The image heating apparatus according to claim 1, wherein the projections and recesses are arranged in a staggered manner such that positions of the projections and recesses in a row of the repeating projections and recesses in the longitudinal direction are offset in the longitudinal direction from positions of the projections and recesses in other rows that are adjacent in the conveyance direction.

8. The image heating apparatus according to claim 1, wherein the heater and the roller are configured to be movable relative to each other to reduce or cancel a pressing force forming the nip.

9. The image heating apparatus according to claim 1, further comprising:

a temperature detection element configured to detect a temperature of the heater, wherein the temperature detection element is pressed against a surface of the heater opposite to a side configured to slide on an inner surface of the film in a direction that separates the heater from the holder.

10. An image forming apparatus comprising:

an image forming portion configured to form an image on a recording material; and a fixing portion configured to fix the image formed on the recording material to the recording material, wherein the fixing portion is the image heating apparatus according to claim 1.

* * * * *